(12) United States Patent
Khaitan et al.

(10) Patent No.: US 8,862,140 B2
(45) Date of Patent: Oct. 14, 2014

(54) METHODS AND APPARATUS FOR DEPLOYMENT AND CONTROL OF SMALL CELLS

(75) Inventors: Varun Khaitan, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/527,451

(22) Filed: Jun. 19, 2012

(65) Prior Publication Data

US 2013/0157652 A1 Jun. 20, 2013

Related U.S. Application Data

(60) Provisional application No. 61/499,080, filed on Jun. 20, 2011.

(51) Int. Cl.
*H04W 40/00* (2009.01)
*H04W 52/16* (2009.01)
*H04W 52/24* (2009.01)
*H04W 84/04* (2009.01)

(52) U.S. Cl.
CPC .............. *H04W 52/24* (2013.01); *H04W 52/16* (2013.01); *H04W 84/045* (2013.01); *H04W 52/242* (2013.01)
USPC ........ 455/449; 455/446; 455/422.1; 455/522; 455/418; 455/419

(58) Field of Classification Search
CPC ... H04W 52/16; H04W 52/24; H04W 52/242; H04W 52/241; H04W 52/243; H04W 52/245; H04W 84/045; H04W 84/02
USPC ............... 455/449, 446, 422.1, 522, 418, 419
See application file for complete search history.

(56) References Cited

U.S. PATENT DOCUMENTS

| | | | |
|---|---|---|---|
| 6,823,193 B1 * | 11/2004 | Persson et al. | 455/522 |
| 8,032,142 B2 * | 10/2011 | Carter et al. | 455/444 |
| 2003/0236103 A1 * | 12/2003 | Tamaki et al. | 455/552.1 |
| 2009/0042593 A1 | 2/2009 | Yavuz et al. | |
| 2009/0135754 A1 | 5/2009 | Yavuz et al. | |
| 2010/0029211 A1 * | 2/2010 | Teague | 455/63.1 |

(Continued)

FOREIGN PATENT DOCUMENTS

| | | | |
|---|---|---|---|
| EP | 2259638 A1 | | 12/2010 |
| EP | 2563078 A1 * | | 2/2013 |
| GB | 2450123 | | 12/2008 |
| WO | 2008093100 A2 | | 8/2008 |

OTHER PUBLICATIONS

International Search Report and Written Opinion—PCT/US2012/043401—ISA/EPO—Sep. 19, 2012.

*Primary Examiner* — Khai M Nguyen

(57) ABSTRACT

Methods and apparatuses are provided for performing power control for a femto node deployed in a wireless network that include adjusting a transmission parameter of the femto node based on one or more radio frequency (RF) environment parameters. An RF environment parameter can be determined for a femto node related to a location in a coverage area. A different RF environment parameter related to other femto nodes at the location in the coverage area can be received from one or more devices, a network listening module, etc. A transmission parameter of the femto node, such as a transmit power, can be adjusted based on the RF environment parameter and the different RF environment parameter.

51 Claims, 13 Drawing Sheets

(56) References Cited

U.S. PATENT DOCUMENTS

| | | | |
|---|---|---|---|
| 2010/0273432 A1* | 10/2010 | Meshkati et al. | 455/67.11 |
| 2011/0081937 A1* | 4/2011 | Nakamura | 455/522 |
| 2011/0105110 A1 | 5/2011 | Carmon et al. | |
| 2011/0170432 A1 | 7/2011 | Grokop et al. | |
| 2011/0217974 A1 | 9/2011 | Naka et al. | |
| 2011/0222484 A1* | 9/2011 | Pedersen et al. | 370/329 |
| 2012/0252521 A1 | 10/2012 | Nagaraja et al. | |
| 2013/0157651 A1* | 6/2013 | Khaitan et al. | 455/422.1 |

* cited by examiner

METHODS AND APPARATUS FOR DEPLOYMENT AND CONTROL OF SMALL CELLS

CLAIM OF PRIORITY UNDER 35 U.S.C. §119

The present Application for Patent claims priority to Provisional Application No. 61/499,080, entitled "METHOD AND SYSTEM FOR DEPLOYMENT AND CONTROL OF SMALL CELLS" filed Jun. 20, 2011, assigned to the assignee hereof and hereby expressly incorporated by reference herein.

BACKGROUND

1. Field

The following description relates generally to wireless network communications, and more particularly to deployment of low power base stations in a wireless network.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection. Because deployment of such base stations is unplanned, low power base stations can interfere with one another where multiple stations are deployed within a close vicinity of one another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with calibrating transmit power of one or more low power base stations in a wireless network. For example, transmit power for a given base station can be configured based on information regarding a radio environment, such as pathloss from the base station to other locations in the vicinity, received signal strength of other neighboring base stations at the other locations, and/or the like. A transmit power can be computed for a base station based on comparing such metrics to one or more thresholds, which can be tuned to provide coverage in certain areas, achieve a network performance metric, mitigate interference to neighboring base stations, etc. In addition, a centralized entity can compute the transmit powers, for example, to ensure one or more coverage areas are provided, to maximize average throughput, and/or the like.

According to an aspect, a method for performing power control for a femto node deployed in a wireless network is provided. The method includes determining a radio frequency (RF) environment parameter of a femto node related to a location in a coverage area and receiving a different RF environment parameter related to other femto nodes at the location in the coverage area. The method further includes adjusting a transmission parameter of the femto node based on the RF environment parameter and the different RF environment parameter.

In another aspect, an apparatus for performing power control for a femto node deployed in a wireless network is provided. The apparatus includes at least one processor configured to determine a RF environment parameter of a femto node related to a location in a coverage area and receive a different RF environment parameter related to other femto nodes at the location in the coverage area. The at least one processor is further configured to adjust a transmission parameter of the femto node based on the RF environment parameter and the different RF environment parameter. The apparatus further includes a memory coupled to the at least one processor.

In yet another aspect, an apparatus for performing power control for a femto node deployed in a wireless network is provided. The apparatus includes means for determining a RF environment parameter of a femto node related to a location in a coverage area and receiving a different RF environment parameter related to other femto nodes at the location in the coverage area. The apparatus further includes means for adjusting a transmission parameter of the femto node based on the RF environment parameter and the different RF environment parameter.

Still, in another aspect, a computer-program product for performing power control for a femto node deployed in a wireless network is provided including a non-transitory computer-readable medium having code for causing at least one computer to determine a RF environment parameter of a femto node related to a location in a coverage area and code for causing the at least one computer to receive a different RF environment parameter related to other femto nodes at the location in the coverage area. The computer-readable medium further includes code for causing the at least one computer to adjust a transmission parameter of the femto node based on the RF environment parameter and the different RF environment parameter.

Moreover, in an aspect, an apparatus for performing power control for a femto node deployed in a wireless network is provided that includes a RF measuring component for determining a RF environment parameter of a femto node related to a location in a coverage area and receiving a different RF environment parameter related to other femto nodes at the location in the coverage area. The apparatus further includes a transmission adjusting component for adjusting a transmission parameter of the femto node based on the RF environment parameter and the different RF environment parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
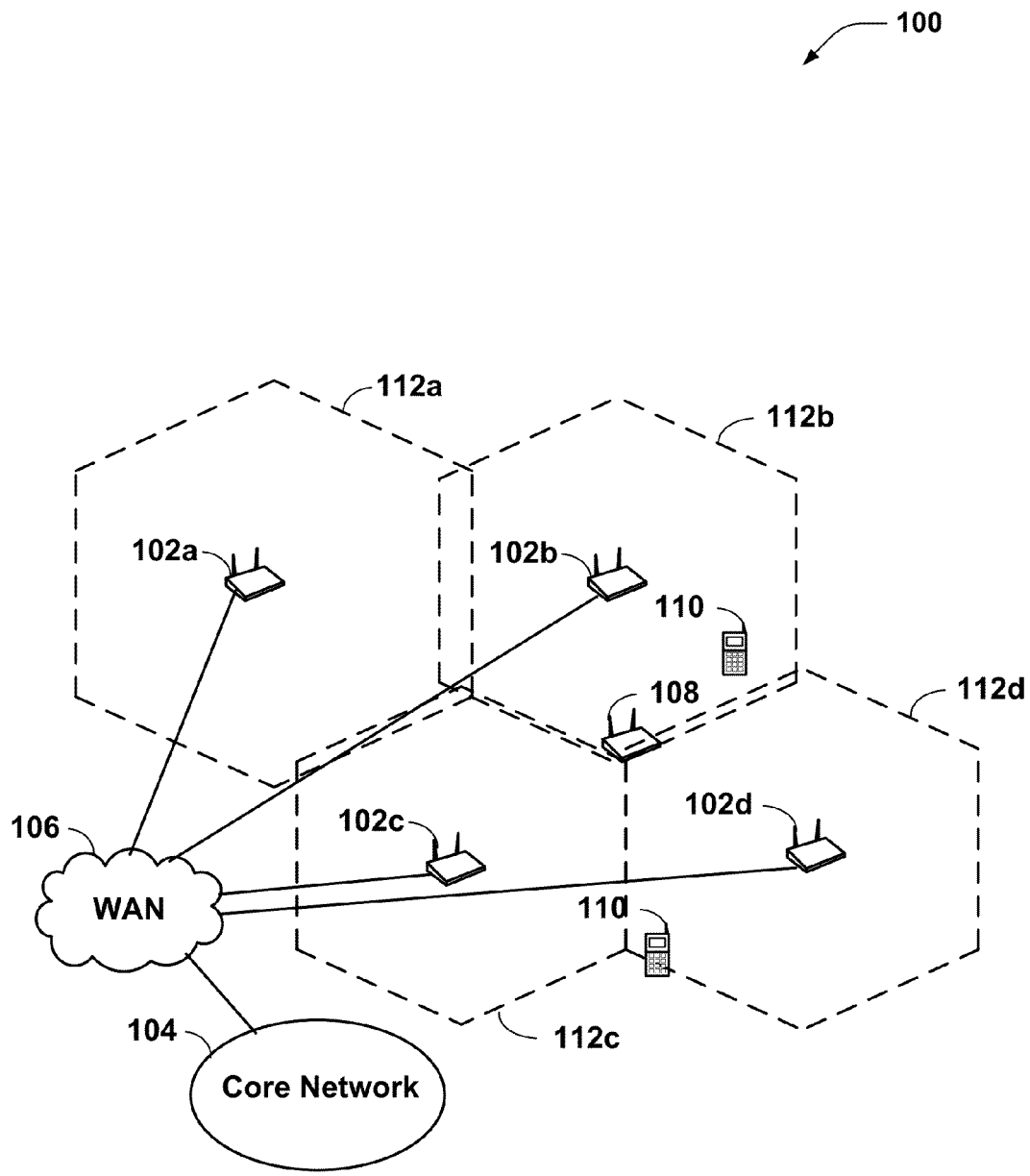
FIG. 1 is a block diagram of an example wireless communication system for employing a plurality of femto nodes.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a transmit power of a low power base station, such as a femto node, can be calibrated based on a radio environment to improve network coverage, mitigate interference among femto nodes, maximize network throughput or other performance metrics, and/or the like. For example, parameters regarding a radio environment, such as pathloss from a femto node to other femto nodes or locations in a vicinity, received signal strength of other femto nodes at the locations in the vicinity, etc., are received at the femto node. A transmit power for the femto node is accordingly set based on comparing the parameters to one or more thresholds. In one example, a centralized entity can set the transmit power for one or more femto nodes based on the received parameters. In either case, the thresholds are tuned to provide coverage in desired areas, to achieve a network performance, and/or the like. Moreover, the transmit power adjustment can be performed periodically for one or more femto nodes as radio conditions can change based on addition of other femto nodes, device mobility, and/or the like.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station. Moreover, for example, low power base stations can be deployed in user homes, offices, other venues, utility polls, public transit, and/or substantially any area to serve a number of devices. For example, a given low power base station may use a smaller scale antenna array that may be attached to a housing for the base station or to a common mounting platform.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long- range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 2:
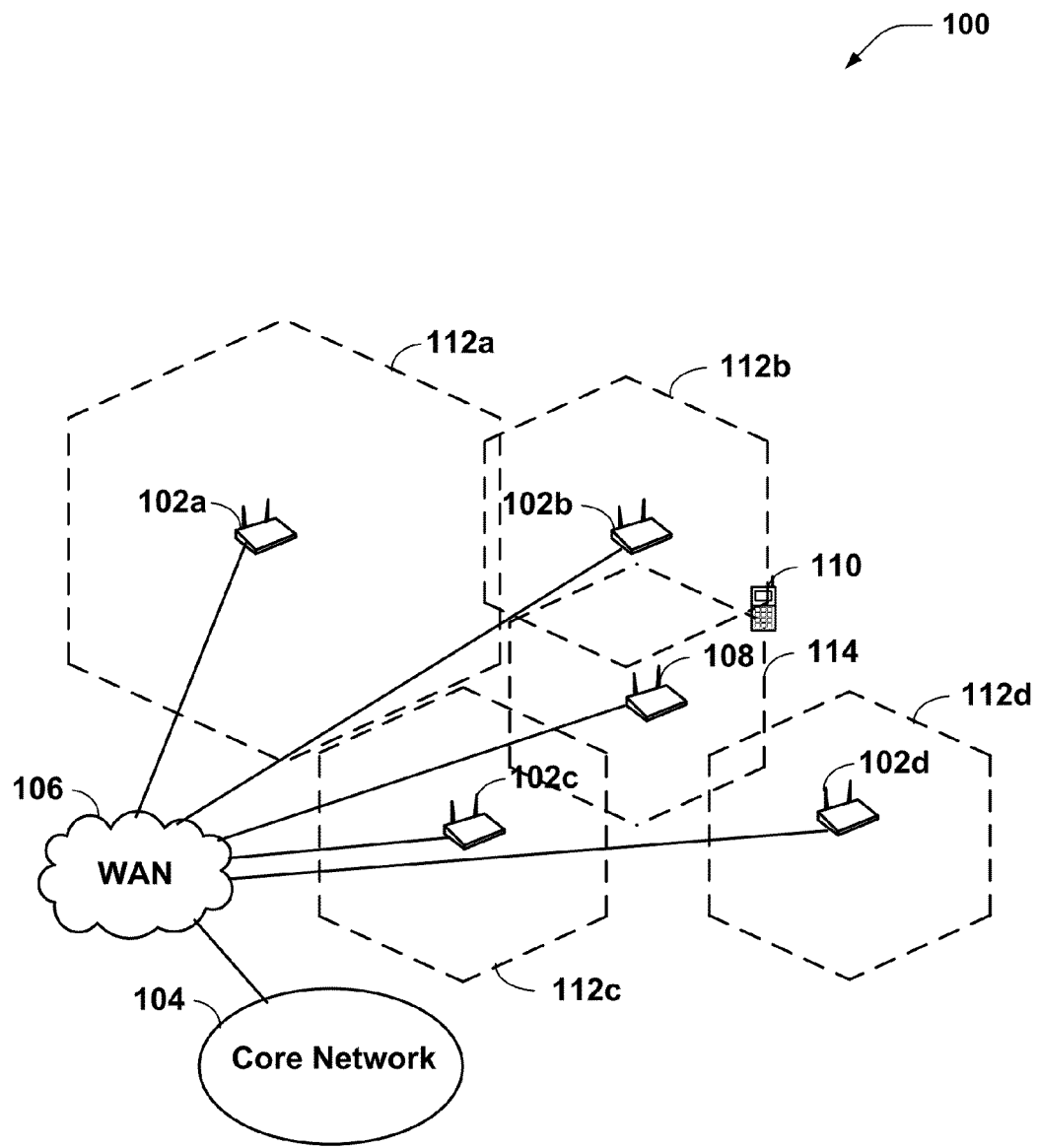
FIG. 2 is a block diagram of an example wireless communication system after activation of a femto node.

FIGS. 1 and 2 illustrate an exemplary autonomously controlled wireless communications system 100 including a plurality of femto nodes 102a-d, or other low power base stations, in communication with an operator core network 104 via a WAN 106. As described, femto nodes 102a-d may comprise relatively low power equipment and may not be provided with a conventional transmission tower. Each femto node 102a-d may be installed and activated in arbitrary chronological order, at an unplanned location. For example, a network operator may provide femto nodes to various different third parties. While the network operator may install and operate some femto nodes in the system 100, each femto node may be autonomously controlled as described herein, and can be added and removed from the system 100 in a flexible, ad-hoc manner.

FIG. 1 shows the system 100 at a first arbitrary point in time after the femto nodes 102a-d are installed and operating. Each of the activated femto nodes 102a-d may provide service to UEs, such as UEs 110, located within corresponding coverage areas 112a-d. For example, a coverage area 112a may be provided by femto node 102a, and so forth. It should be appreciated that coverage areas 112a-d may not have a regular or uniform geometrical shape, and may vary in shape and extent based on local factors such as topology of the landscape and the presence or absence of blocking objects in an area. For example, the femto nodes 102a-d can initialize transmit power to establish coverage areas 112a-d based on at least one of establishing a fixed initial power that can be adjusted based on RF environment parameters, as described with respect to femto node 108 herein, establishing the initial power based on measured RF environment parameters (e.g., using a network listening module (NLM)), and/or the like. It is to be appreciated that transmit power can be initialized subject to a minimum and/or maximum transmit power as well. For example, establishing the fixed transmit power can also include receiving the power as part of a configuration, determining the power as a function of femto node 102a-d capabilities—such as number of users it can support, maximum power capability, backhaul availability, etc. Coverage areas 112a-d may also vary based on the receiving and transmitting capabilities of UEs 110 using a particular femto node 102a-d. For example, a UE having a transceiver with greater range capabilities may be able to make use of a particular femto node in a larger area than a UE with a less capable transceiver. Areas of overlap or interference may exist between adjacent coverage areas, as may coverage gaps. System 100 also includes a femto node 108 that has not yet been powered on or otherwise activated service in the wireless network.

FIG. 2 shows the system 100 after the femto node 108 is activated. For example, once activated, the femto node 108 can be used to access the wireless communication system 100 in a corresponding coverage area 114. The coverage area 114 is related to transmit power of the femto node 108, which the femto node 108 may control autonomously based on one or more measurements of an RF environment, as described herein. In addition, each of femto nodes 102a-d may measure their own respective RF environments, and similarly configure or otherwise adjust their own transmit power in response to changes related to activation of femto node 108. For example, femto nodes 102b-c may decrease power, while femto node 102a may maintain transmit power unchanged in view of activation of femto node 108. Similar adjustments may be made periodically (e.g., according to a timer or other event), such as when an RF environment changes due to activation of a femto node, deactivation of a femto node, a UE 110 initiating or releasing a voice call or other connection, interference in one or more femto node coverage areas, etc.

In an example, femto node 108 can initialize or otherwise adjust transmit power based on at least one of pathloss from the femto node 108 to one or more nearby locations, received signal strength of at least some of femto nodes 102a-d (or other femto nodes) in the one or more locations, and/or the like. For instance, the location can relate to a UE 110 or one or more femto nodes 102a-d, and thus the pathloss can be obtained based on signals received therefrom. In some examples, femto node 108 can measure the pathloss using a co-located NLM in femto node 108, based on pathloss observed by one or more served UEs (e.g., as received from the UE or over a backhaul from one or more femto nodes), and/or the like. Similarly, the UE 110 or femto nodes 102a-d can measure and report signal strength of other femto nodes observed at the location to femto node 108. In one example, where the location relates to UE 110, UE 110 can measure received signal strengths or other RF environment parameters of femto nodes 102a-d at the location of UE 110 and provide the measurements to femto node 108. In any case, femto node 108 sets the transmit power based in part on comparing the pathloss, received signal strength, etc. to one or more thresholds. The thresholds can be tuned to achieve a desired network propagation and/or performance through femto node transmit power adjustment. In other examples, the femto node 108, UEs 110, femto nodes 102a-d, etc. can report the pathloss, received signal strength, etc. to a centralized entity (not shown), which can be part of core network 104. In this example, the centralized entity can perform the transmit power determinations and accordingly communicate a transmit power or related adjustment to femto node 108 and/or other femto nodes.

Figure 3:
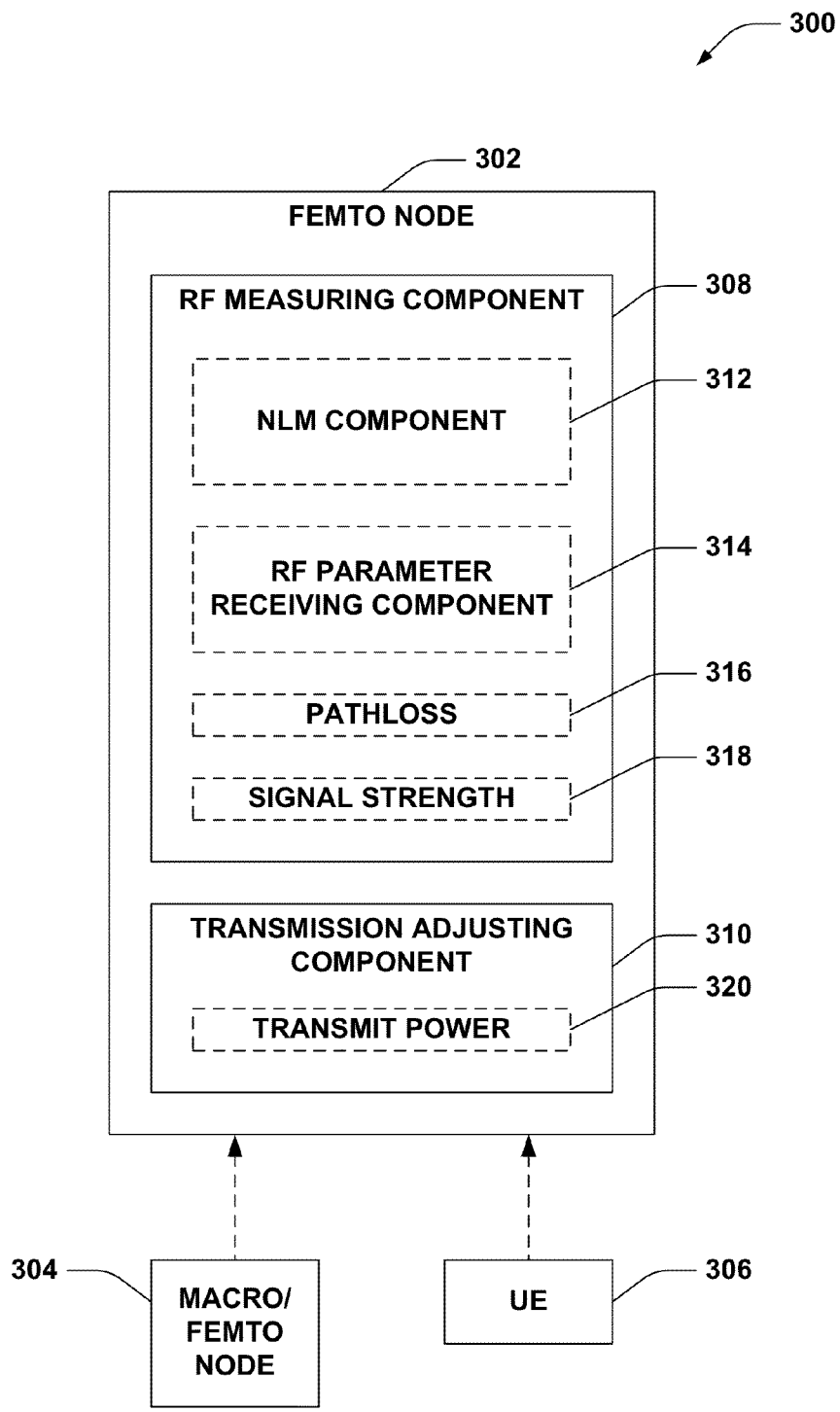
FIG. 3 is a block diagram of an example system for adjusting transmission parameters of femto nodes based on measured radio frequency (RF) environment parameters.

Referring to FIG. 3, an example wireless communication system 300 is illustrated that facilitates adjusting transmit power of a femto node based on measurements over an RF environment. System 300 includes a femto node 302 that can measure its RF environment, which can include signals from a macro/femto node 304, signal measurements reported by a UE 306, and/or the like. Femto node 302 can be substantially any low power base station, or portion thereof, as described, a UE (e.g., communicating in peer-to-peer or ad-hoc mode with other UEs), etc. Macro/femto node 304 can be a macro node, pico node, femto node, mobile base station, a UE, a portion thereof, etc. UE 306 can be a mobile terminal, stationary device, modem (or other tethered devices), a portion thereof, and/or substantially any device that wirelessly communicates with femto and/or macro nodes.

Femto node 302 can include an RF measuring component 308 for measuring one or more parameters of an RF environment, and a transmission adjusting component 310 for modifying transmit power of femto node 302 based on the one or more parameters. RF measuring component 308 can include a NLM component 312 for receiving signals from one or more nodes in an RF environment, and an RF parameter receiving component 314 for obtaining one or more RF environment parameters from a UE communicating with femto node 302.

According to an example, RF measuring component 308 can obtain one or more parameters regarding an RF environment, referred to herein as RF environment parameters or generally as RF parameters. For example, this can occur based on initializing or powering on femto node 302, based on a detected change in one or more RF parameters, based on a timer or other event, etc. In one example, the RF environment parameters can correspond to a location near femto node 302. RF measuring component 308 can measure a pathloss 316 to a node at the location, such as UE 306 or other nodes in a wireless network. RF measuring component 308 can obtain multiple measurements of a given RF parameter over a period of time, in one example. Further, in an example, NLM component 312 can measure pathloss 316 to the location based on signals received from the UE 306 or other nodes related to the location.

Moreover, in an example, RF measuring component 308 can obtain signal strength 318 related to the macro/femto node 304 and/or other femto nodes observed at the location (e.g., by UE 306 or other node related to the location). For example, signal strength 318, in one example, can relate to a received signal strength indicator (RSSI), signal-to-noise ratio (SNR), signal-to-interference-and-noise ratio (SINR), interference-over-thermal (IoT), total channel received signal level (Io), a pilot amplitude (Ecp), a ratio of a pilot signal amplitude to a received signal level (Ecp/Io), or other signal or interference measurement at the location. In one example, the UE 306 and/or other nodes (e.g., multiple UEs) related to the location perform the measurements. In one example, RF measuring component 308 can instruct UEs in service of femto node 302 to perform such measurements of signals observed by the UEs, and report the measurements to femto node 302. RF measuring component 308 can so instruct UE 306 using candidate frequency search report message (CFS-RPM), periodic pilot strength measurement message (PPSMM), etc. in cdma2000, or through a proprietary signaling scheme. In another example, RF parameter receiving component 314 can obtain the measurements as part of a measurement report form UE 306 or other nodes related to the location in relation to handover, cell reselection, or other mobility procedures.

It is to be appreciated, however, that NLM component 312 can measure the pathloss, signal strength parameters, or other RF environment parameters. In another example, it is to be appreciated that RF parameter receiving component 314 can receive the pathloss (e.g., to femto node 302), signal strength parameters, or other RF environment parameters from UE 306 or other femto nodes (e.g., over a backhaul connection) as observed by the femto nodes, reported to the femto nodes by other UEs, and/or the like. Moreover, as described further herein, RF parameter receiving component 314 can receive the pathloss, signal strength parameters, or other RF environment parameters from a centralized entity based on multiple measurements received from various sources. In any case, transmission adjusting component 310 can adjust a transmission parameter based in part on the RF environment parameters.

For example, transmission adjusting component 310 can compute a transmit power 320 or determine other parameter, such as a modulation and coding scheme (MCS), frequency/time resource utilization, access mode (e.g., open, closed, or hybrid access modes for femto nodes), antenna selection, antenna pattern selection, and/or the like, based on the RF environment parameters as related to one or more thresholds. The thresholds can be determined based on achieving a desired network coverage or performance, for example. In one specific example, where the UE 306 experiences pathloss to femto node 302 below a threshold along with measured signal strength of macro/femto node 304 below another threshold, this can indicate an area of insufficient network coverage. Thus, transmission adjusting component 310 can accordingly modify one or more transmission parameters, such as a transmit power 320 of femto node 302, to provide coverage in the area of UE 306. Transmission adjusting component 310 can compute the transmit power 320, for example, based on a difference between the pathloss and the threshold, the difference between the signal strength of macro/femto node 304 and the another threshold, using a formula employing these parameters, and/or the like. This can be based on a distributed algorithm, as described herein.

Transmission adjusting component 310 can also select an initial value for transmit power 320, or other transmission parameters, based on pathloss 316, signal strength 318, etc. measured by NLM component 312 of other macro/femto nodes, such as macro/femto node 304. Then as UEs come onto its network, such as UE 306, the RF measuring component 308 can request signal measurements from the UEs at respective locations, and/or NLM component 312 can determine pathloss to the UEs. Based on these received and/or determined RF environment parameters, transmission adjusting component 310 can determine its target locations for network coverage and/or can accordingly adjust transmit power 320 or other transmission parameters to cover the areas, to provide a desired throughput, and/or the like.

In any case, transmission adjusting component 310 can compute a transmit power 320 or other parameter related to transmitting in a wireless network for femto node 302. For example, the transmit power 320 or other parameter can be computed based on the pathloss 316, signal strength 318, or other RF environment parameters, as measured or received by femto node 302. For instance, the transmit power 320 can be computed for individual locations, or based on RF environment parameters measured or received for multiple locations (e.g., as a minimum, maximum, average, weighted average, etc., of the RF environment parameters). In one example, transmission adjusting component 310 can compute transmit power 320 using the following formula:

$$P_{tx} = PL - \text{Channel}_{loading} Nt + Ect/Nt_{threshold}$$

where $P_{tx}$ is transmit power 320, PL is pathloss 316 to one or more locations (e.g., as related to a UE or node in the location(s)), $\text{Channel}_{loading}$ represents a ratio of traffic power to total power, Nt is signal strength 318 at the one or more locations (e.g., as reported by or otherwise related to the UE or node in the location(s)), and $Ect/Nt_{threshold}$ represents a coverage threshold. As described, the thresholds used to decide the target areas of coverage and coverage thresholds can be tunable and adjusted based on at least one of a desired propagation environment, a network performance metric, and/or the like.

In a distributed setting, the transmit power of a femto node may depend on current transmit power of the other femto nodes (e.g., as reported by UEs). As these power levels change over time, RF environment parameter measurement by RF measuring component 308, and associated transmission parameter adjustment by transmission adjusting component 310, can be performed periodically to move towards equilibrium. In addition, the measured signal strengths 318 for a given location can change over time as more nodes are added to or removed from the system, as the locations/power levels of the existing nodes are changed, etc. Thus, in an example, RF measuring component 308 can periodically determine to measure the RF environment parameters for providing to transmission adjusting component 310 based on one or more timers or events. For example, this can include detecting establishment or termination of a voice call or other connection, detecting a threshold change in one or more RF environment parameters at femto node 302 or as reported by one or more served UEs, detecting an offloading of UEs from femto node 302 or macro/femto node 304 or other change in load at the femto node respective to one or more thresholds, receiving a network loading indication from the femto node 302 and/or macro/femto node 304, and/or the like.

Moreover, in an example, mobility of UEs and/or changes in cell loading over time can result in a dynamic network, and as a result, some femto nodes can become more loaded with served UEs than others. Thus, for transmission based on relative load between cells, transmit powers of femto nodes may be changed to share/offload users among the femto nodes. In this example, transmission adjusting component 310 can modify the thresholds described above to reach a desired load for femto node 302 or other femto nodes. In one example, transmission adjusting component 310 can lower a coverage threshold where a lower load is desired for a given femto node. This can result in transmission adjusting component 310 decreasing transmit power 320 or otherwise computing a lower transmit adjustment according to the formula above.

In other examples, transmission adjusting component 210 can compare pathloss 316 and/or signal strength 318 to a threshold to determine a MCS. For example, where the pathloss 316 is over the threshold and/or signal strength 318 is under the threshold, transmission adjusting component 210 can select a MCS that allows for modulating data over an increased number of resources than where pathloss 316 is under the threshold and/or signal strength 318 is over the threshold. Similarly, transmission adjusting component 210 can adjust frequency/time resource utilization where pathloss 316 is over the threshold and/or signal strength 318 is under the threshold in order to prevent interference to other nodes.

In other examples, transmission adjusting component 210 can modify an access mode (e.g., open, closed, or hybrid access modes for femto nodes) based on comparing pathloss 316 and signal strength 318 to the threshold. For example, femto nodes can operate in an open access mode where substantially any UE is allowed access to the femto node, a closed access mode where only some UEs are allowed to access the femto node (e.g., UEs in a closed subscriber group (CSG), as described further herein), or a hybrid access mode where the femto node can provide varying levels of access to a given UE (e.g., improved access to UEs in a CSG as opposed to those not in the CSG). Where the pathloss 316 from other nodes are over the threshold and/or signal strength 318 from other nodes are below a threshold, this can indicate a coverage gap, and thus transmission adjusting component 210 may choose to operate femto node 202 in an open mode, where femto node previously operated in a closed mode, to serve UEs in the coverage gap. Moreover, transmission adjusting component 210 can modify antenna selection, antenna pattern selection (e.g., a number of antennas used to communicate and/or selecting certain antennas for communicating), and/or the like according to the pathloss 316 and/or signal strength 318 threshold comparison. Though one threshold is described, it is to be appreciated that multiple thresholds can be used to determine different transmit parameters, and/or the transmission adjusting component 210 can determine transmit parameters as a function of the pathloss 316, signal strength 318, and/or a difference thereof from the threshold.

Figure 4:
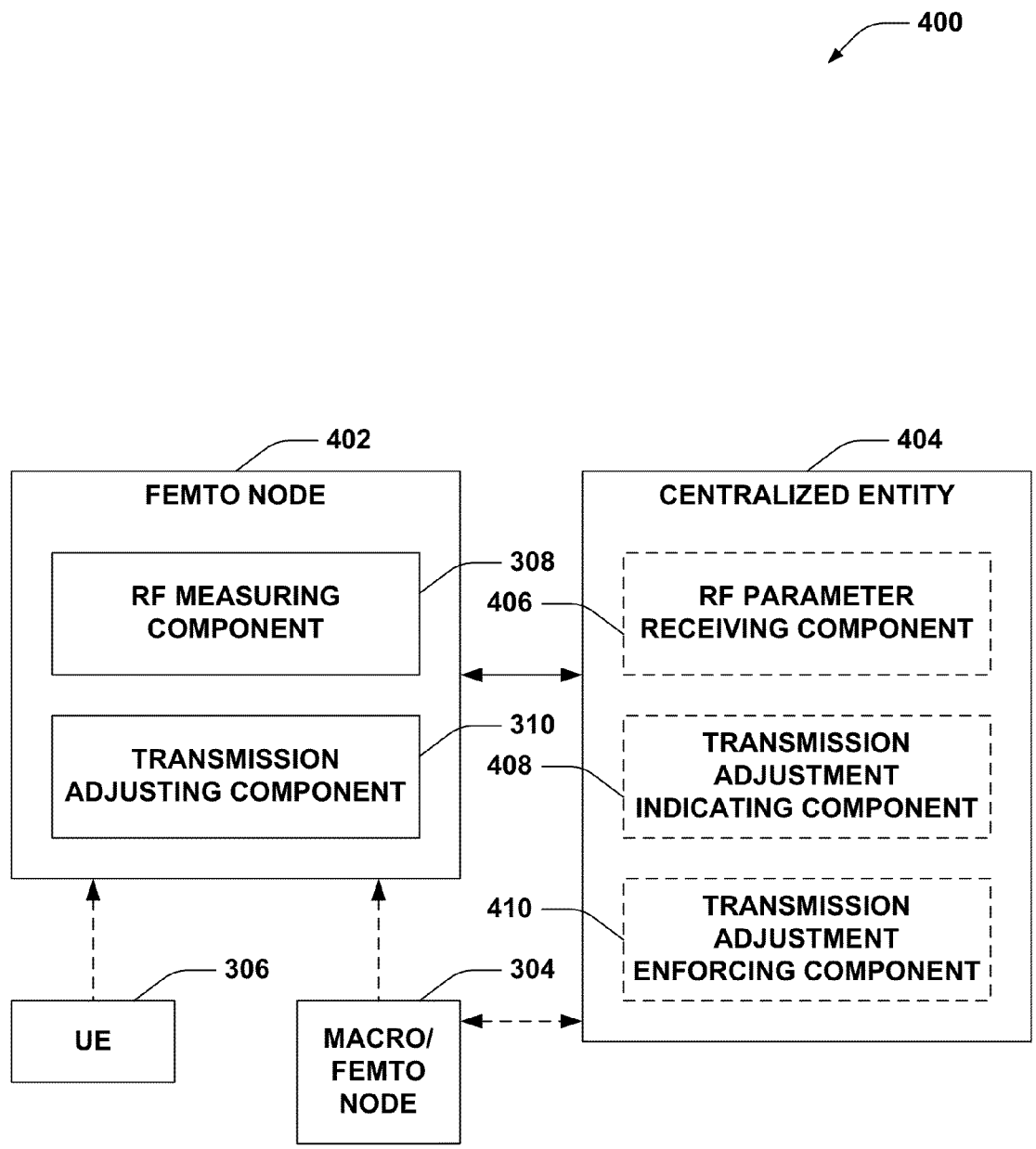
FIG. 4 is a block diagram of an example system for adjusting transmission parameters of one or more femto nodes based on received RF environment parameters.

Turning to FIG. 4, an example wireless communication system 400 is illustrated for provisioning transmission adjustment information to one or more femto nodes. System 400 includes a femto node 402 that communicates in a wireless network, as described. System 400 also includes a macro/femto node 304 and UE 306, from which femto node 402 can receive RF environment information, as described. System 400 additionally includes a centralized entity 404 that can communicate with one or more femto nodes in a wireless network, such as femto node 402 and/or macro/femto node 304 to provision transmission adjustment information thereto.

For example, centralized entity 404 can be a H(e)NB gateway or other femto node gateway in a core wireless network, another supporting node in the wireless network, a specific femto node responsible for provisioning transmission adjustment information to other femto nodes in a similar network or grouping of femto nodes (e.g., nodes in a given closed subscriber group (CSG)), a server or other computing device operating in one or more networks, and/or the like. Femto node 402 and/or macro/femto node 304 can communicate with centralized entity 404 over a backhaul or other connection to a wireless network within which the centralized entity 404 operates.

Femto node 402 includes a RF measuring component 308 for determining one or more parameters related to an RF environment, and a transmission adjusting component 310 for modifying one or more transmission parameters based on the RF environment, as described.

Centralized entity 404 optionally includes an RF parameter receiving component 406 for obtaining one or more parameters related to an RF environment from a femto node, and a transmission adjustment indicating component 408 for provisioning a transmission adjustment to femto node 402 based on the one or more parameters. Centralized entity 404 can also optionally include a transmission adjustment enforcing component 410 for providing a transmission adjustment mechanism or algorithm to one or more femto nodes to ensure uniform transmission adjustment control.

According to an example, RF measuring component 308 can perform measurements of one or more RF environment parameters, as described above, such as a pathloss to a location, which can correspond to UE 306 or other nodes, a signal strength of macro/femto node 304 or other nodes measured at or near the location, and/or the like, which can be obtained via an NLM component, UE 306, or other nodes. RF measuring component 308 can provide the RF environment parameters to centralized entity 404. RF parameter receiving component 406 can obtain the one or more RF environment parameters from femto node 402. In other examples, RF parameter receiving component 406 can measure the parameters and/or obtain the parameters from UEs, such as UE 306, communicating with one or more femto nodes. In addition, RF parameter receiving component 406 can receive RF environment parameters from a plurality of femto nodes.

In an example, transmission adjustment indicating component 408 can determine an adjusted value for a transmission parameter, such as a transmit power for one or more femto nodes, based on the RF parameters, and can communicate the adjustment value to femto node 402. This can occur as described above, such that the computing functionality is moved from the femto node 402 to centralized entity 404. In another example, transmission adjustment indicating component 408 can consider RF parameters measured by additional macro/femto nodes, such as macro/femto node 304, for determining a transmission adjustment for femto node 402. Transmission adjustment indicating component 408 can determine RF parameters for a neighboring macro/femto node of femto node 402, for instance, based on RF parameters received from femto node 402 and other femto nodes. Thus, transmission adjustment indicating component 408 can generate transmission adjustments based on the determined RF parameters from multiple sources. In another example, transmission adjustment indicating component 408 can generate transmission adjustments for femto node 402 based in part on transmission adjustments generated for other femto nodes near femto node 402.

Moreover, for example, transmission adjustment indicating component 408 can generate a transmission parameter adjustment for a given femto node in an effort to provide good coverage to the total area. As an example, transmission adjustment indicating component 408 can ensure a certain fraction of reporting areas have coverage (e.g., $Ect/Nt > Ect/Nt_{threshold}$ using the formula described above) or maximize the average throughput of the system (e.g., an entire or larger wireless network) in generating a transmission parameter adjustment. In another example, the transmission adjustment indicating component 408 can determine a transmission parameter adjustment for providing constraint on the transmission parameters of one or more femto nodes. As an example, transmission adjustment indicating component 408 can minimize the total sum of transmit powers for the one or more femto nodes. Furthermore, in an example, transmission adjustment indicating component 408 can use the RF environment parameters of other femto nodes in determining an RF environment for femto node 402, as described.

In any case, transmission adjustment indicating component 408 can generate the transmission adjustments using formulas similar to those described above, where thresholds can be set to arrive at certain network coverage and/or performance metrics. Transmission adjustment indicating component 408 can communicate the transmission adjustment to femto node 402. Transmission adjusting component 310 can obtain the transmission adjustment and accordingly effectuate the adjustment (e.g., modify a transmit power of femto node 402 where the transmission adjustment relates to transmit power). In this regard, transmission parameters related to femto node 402 and/or other femto nodes, such as macro/femto node 304, can be adjusted based on RF environment and/or other parameters of nearby femto nodes to provide the desired network coverage and/or performance.

As described, adaptability of a wireless communication system to changes in activated access points (e.g., activation, deactivation, or change in transmit power) is an advantageous result of the described aspects. To achieve this result, femto nodes in the system can make use of power control functions that are compatible between nodes. For example, an autonomous transmit power control method used by a femto node can be known or at least discoverable by another femto node (e.g., either expressly or implicitly) and vice versa. Implicit discovery may include enforcing an identical or backward-compatible version of autonomous transmit power control algorithm in all femto nodes of the system (or at least for a group of associated femto nodes). Moreover, in this example, version control of autonomous transmit power control may be performed by a core network entity at the time a new femto node is connecting to the network system.

In this example, transmission adjustment enforcing component 410 can provision one or more parameters regarding transmit power control to femto node 402 and/or other femto nodes, such as macro/femto node 304, upon connecting to a wireless network. Before enabling use of the new femto node 402, for example, transmission adjustment enforcing component 410 can confirm that the femto node 402 uses a compatible autonomous transmit power control. This can be a query performed to the femto node 402 and based on a received response, a verification performed in subscription information for the femto node 402, a query to one or more other network components associated with femto node 402, and/or the like. In one example, this can include verifying compatible version information of the transmit power control algorithm. If compatibility can be confirmed, the transmission adjustment enforcing component 410 may enable connection and operation of the femto node 402. If compatibility cannot be confirmed, the transmission adjustment enforcing component 410 may provide a compatible software component to the femto node, disable connection of the femto node to the network (e.g., at least until a provided software component is installed on the femto node and compatibility can be confirmed), and/or the like. Thus, transmission adjustment enforcing component 410 can ensure that femto nodes 402 communicating in the network use a compatible transmit power control algorithm to facilitate calibration as described herein.

Figure 5:
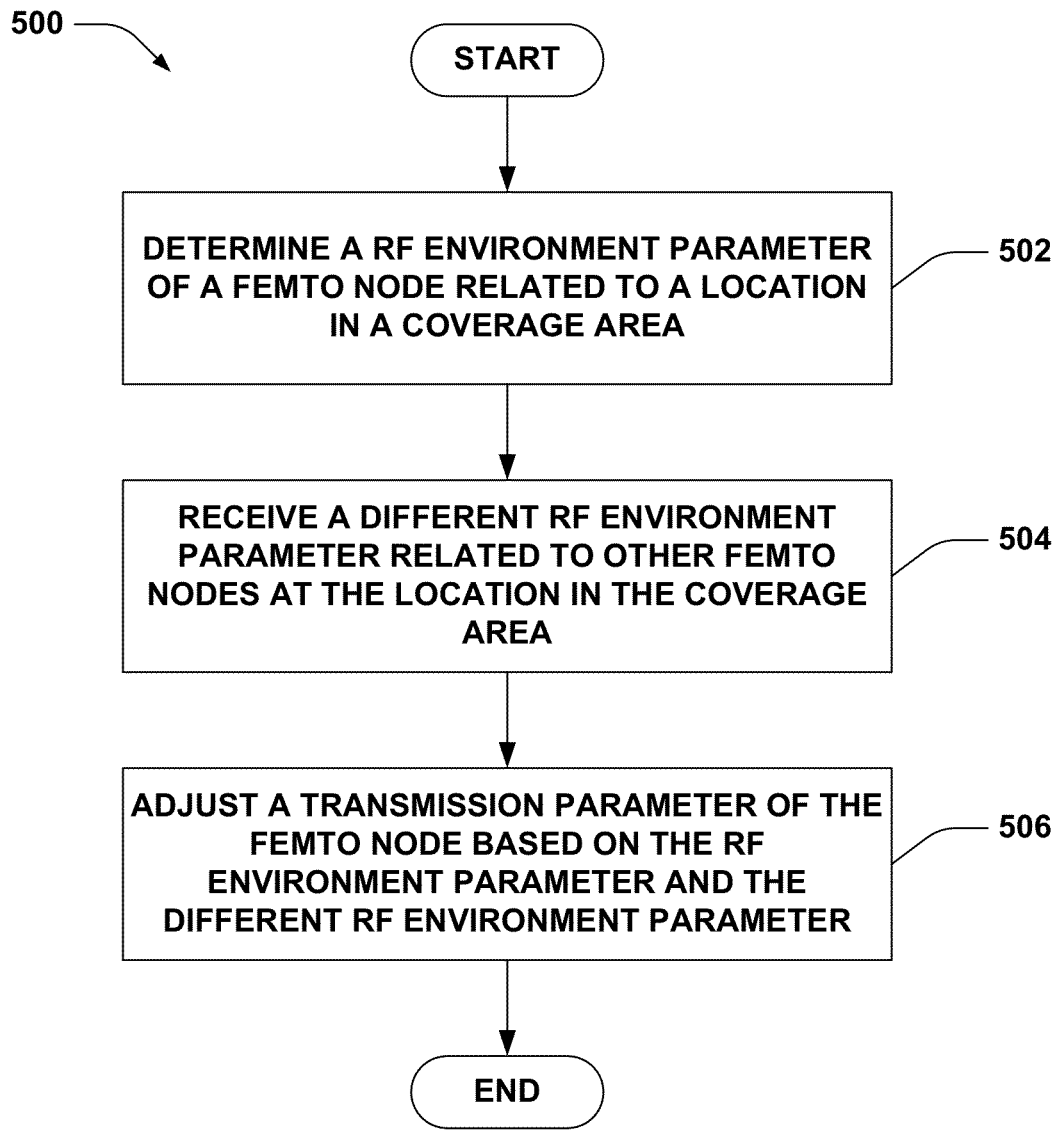
FIG. 5 is a flow chart of an aspect of an example methodology for adjusting a transmission parameter based on one or more RF environment parameters.
Figure 6:
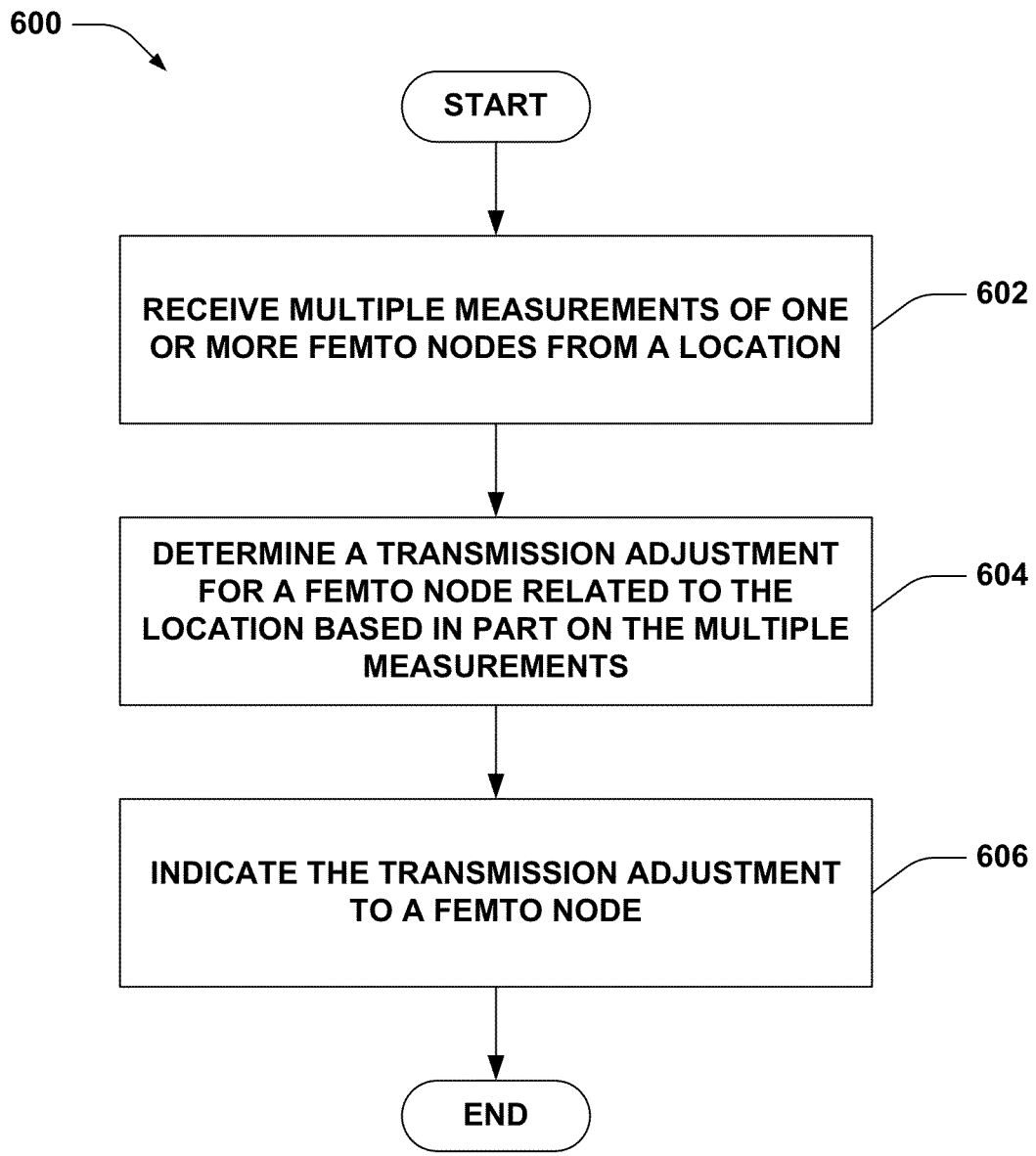
FIG. 6 is a flow chart of an aspect of an example methodology for indicating transmission parameter adjustment based on one or more RF environment parameters.

FIGS. 5-6 illustrate example methodologies relating to modifying transmission parameters based on measured RF environment parameters. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 5 depicts an example methodology 500 for adjusting transmission parameters of a femto node based on RF environment parameters. In one example, the methodology 500 can be performed by femto node 302, centralized entity 404, or related components, processors, etc.

At 502, a RF environment parameter of a femto node related to a location in a coverage area can be determined. For example, the location can be near femto node coverage and can correspond to a location of a UE, another femto node, etc. In one example, the determined RF environment parameter can be a pathloss from the femto node to the location. Thus, the RF environment parameter can be measured by at least one of the femto node using an NLM (e.g., as a pathloss based on a signal from the UE or other femto node), or the UE or other femto node and reported to the femto node.

At 504, a different RF environment parameter related to other femto nodes at the location in the coverage area can be received. In one example, the different RF environment parameter can relate to signals received at the location (e.g., by the UE), and can be a signal strength or quality metric, as described (e.g., SNR, SINR, IoT, RSSI, Io, ECP, ECP/Io, etc.). The different RF environment parameter can be requested from one or more UEs, received as measurements in a measurement report for handover, reselection, or other mobility procedure, and/or the like.

At 506, a transmission parameter of the femto node can be adjusted based on the RF environment parameter and the different RF environment parameter. For example, the transmission parameter can be a transmit power, MCS, or other parameter of the femto node. Where RF environment parameter is a pathloss that is below a threshold, and the different RF environment parameter is a signal strength below a threshold, for example, a transmit power of the femto node can be increased at 506 to include the location in a coverage area of the femto node. In this regard, the transmit power can be computed based on a difference between the pathloss and its threshold and/or the signal strength and its threshold, as described. The thresholds can be set to achieve a certain network coverage and/or performance.

In one example, where implemented by a centralized entity, determined RF environment parameter and/or the received different RF environment parameter can be obtained from the femto node. In this regard, the transmission parameter adjustment can relate to determining an adjustment value or a value for a parameter of the femto node, and communicating the adjustment value or value to the femto node.

FIG. 6 illustrates an example methodology 600 for determining transmission adjustments for one or more femto nodes based on received RF environment parameters. In one example, the methodology 600 can be performed by centralized entity 404, substantially any femto node in a network of femto nodes, or related components, processors, etc.

At 602, multiple measurements of one or more femto nodes from a location can be received. For example, this can include receiving multiple pathloss measurements to a given femto node from the location, receiving signal strength measurements of a set of femto nodes observed at the location, and/or the like. For example, the measurements can be received from a femto node desiring a transmission adjustment based on the measurements, from one or more UEs at the location, and/or the like. In one example, where multiple measurements are received, the measurements can be averaged or otherwise combined to generate a more accurate representation of pathloss, signal strength, and/or the like given the multiple measurements.

At 604, a transmission adjustment can be determined for a femto node related to the location based in part on the multiple measurements. As described, this can include computing the adjustment using the measurements and related thresholds that are set to achieve a certain network coverage and/or performance. Moreover, the transmission adjustment can correspond to a transmit power, MCS, or other RF environment parameter for the femto node, and can be an adjustment value or an actual value for the parameter at the femto node.

At 606, the transmission adjustment can be indicated to the femto node. For example, this can occur via backhaul communication to the femto node. Thus, the femto node can accordingly adjust a transmission parameter based on the indicated transmission adjustment.

It will be appreciated that, in accordance with one or more aspects described herein, inferences can be made regarding measuring the RF environment parameters, adjusting the thresholds to achieve a certain network coverage and/or performance, determining the transmission adjustment based on the parameters and thresholds, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
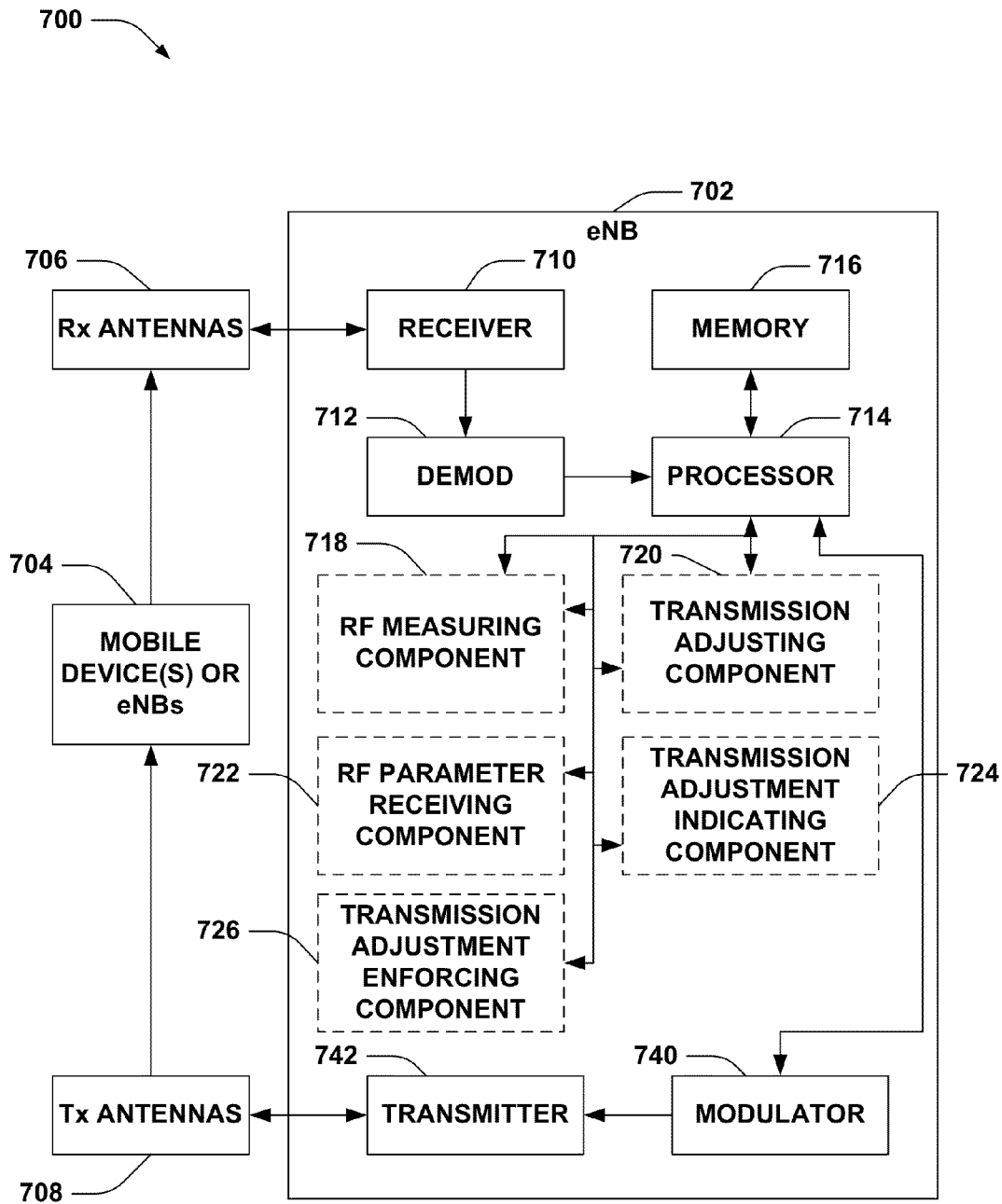
FIG. 7 is a block diagram of a system in accordance with aspects described herein.

FIG. 7 is an illustration of a system 700 that facilitates classifying UEs for mitigating interference thereto. System 700 includes a eNB 702 having a receiver 710 that receives signal(s) from one or more mobile devices or eNBs 704 through a plurality of receive antennas 706 (e.g., which can be of multiple network technologies), and a transmitter 742 that transmits to the one or more mobile devices or eNBs 704 through a plurality of transmit antennas 708 (e.g., which can be of multiple network technologies). For example, eNB 702 can transmit signals received from eNBs 704 to other eNBs 704, and/or vice versa. Receiver 710 can receive information from one or more receive antennas 706 and is operatively associated with a demodulator 712 that demodulates received information. In addition, in an example, receiver 710 can receive from a wired backhaul link. Though depicted as separate antennas, it is to be appreciated that at least one of receive antennas 706 and a corresponding one of transmit antennas 708 can be combined as the same antenna. Demodulated symbols are analyzed by a processor 714, which is coupled to a memory 716 that stores information related to performing one or more aspects described herein.

Processor 714, for example, can be a processor dedicated to analyzing information received by receiver 710 and/or generating information for transmission by a transmitter 742, a processor that controls one or more components of eNB 702, and/or a processor that analyzes information received by receiver 710, generates information for transmission by transmitter 742, and controls one or more components of eNB 702. In addition, processor 714 can perform one or more functions described herein and/or can communicate with components for such a purpose.

Memory 716, as described, is operatively coupled to processor 714 and can store data to be transmitted, received data, information related to available channels, data associated with analyzed signal and/or interference strength, information related to an assigned channel, power, rate, or the like, and any other suitable information for estimating a channel and communicating via the channel. Memory 716 can additionally store protocols and/or algorithms associated with measuring RF environment parameters, adjusting transmission parameters, and/or the like.

It will be appreciated that the data store (e.g., memory 716) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 716 of the subject systems and methods is intended to comprise, without being limited to, these and any other suitable types of memory.

Processor 714 is further optionally coupled to a RF measuring component 718, which can be similar to RF measuring component 308, a transmission adjusting component 720, which can be similar to transmission adjusting component 310, an RF parameter receiving component 722, which can be similar to RF parameter receiving component 406, a transmission adjustment indicating component 724, which can be similar to transmission adjustment indicating component 408, and/or a transmission adjustment enforcing component 726, which can be similar to transmission adjustment enforcing component 410. Moreover, for example, processor 714 can modulate signals to be transmitted using modulator 740, and transmit modulated signals using transmitter 742. Transmitter 742 can transmit signals to mobile devices or eNBs 704 over Tx antennas 708. Furthermore, although depicted as being separate from the processor 714, it is to be appreciated that the RF measuring component 718, transmission adjusting component 720, RF parameter receiving component 722, transmission adjustment indicating component 724, transmission adjustment enforcing component 726, demodulator 712, and/or modulator 740 can be part of the processor 714 or multiple processors (not shown), and/or stored as instructions in memory 716 for execution by processor 714.

Figure 8:
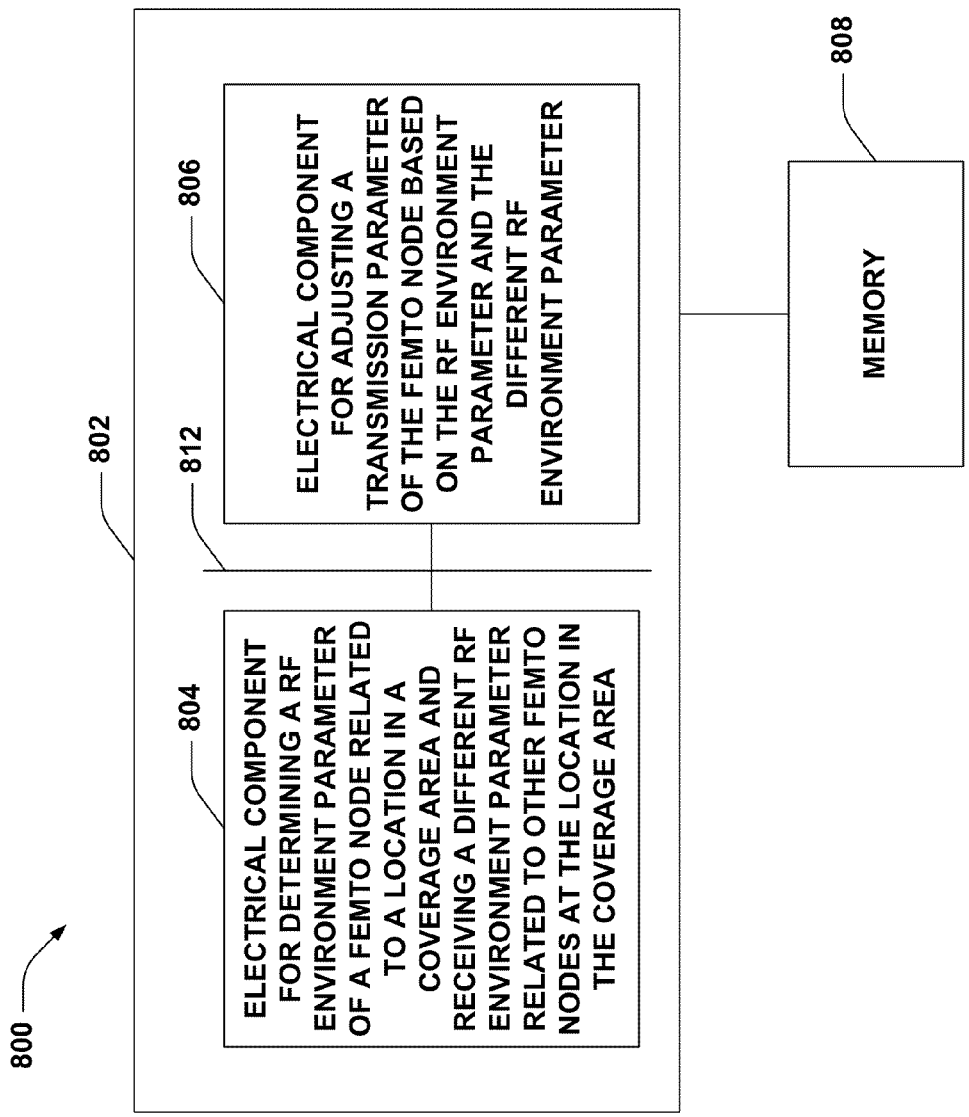
FIG. 8 is a block diagram of an aspect of a system that adjusts a transmission parameter based on one or more RF environment parameters.

FIG. 8 illustrates a system 800 for adjusting a transmission parameter of a femto node based on one or more RF environment parameters. For example, system 800 can reside at least partially within a femto node or other low power base station, a centralized entity, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for determining a RF environment parameter of a femto node related to a location in a coverage area and receiving a different RF environment parameter related to other femto nodes at the location in the coverage area 804. Further, logical grouping 802 can include an electrical component for adjusting a transmission parameter of the femto node based on the RF environment parameter and the different RF environment parameter 806.

For example, electrical component 804 can include a RF measuring component 308, NLM component 312, RF parameter receiving component 314, etc., as described above. In addition, for example, electrical component 806, in an aspect, can include a transmission adjusting component 310, as described.

Additionally, system 800 can include a memory 808 that retains instructions for executing functions associated with the electrical components 804 and 806. While shown as being external to memory 808, it is to be understood that one or more of the electrical components 804 and 806 can exist within memory 808. Moreover, for example, electrical components 804 and 806 can be interconnected by a bus 812. In one example, electrical components 804 and 806 can include at least one processor, or each electrical component 804 and 806 can be a corresponding module of at least one processor. Moreover, in an additional or alternative example, electrical components 804 and 806 can be a computer program product comprising a computer readable medium, where each electrical component 804 and 806 can be corresponding code.

Figure 9:
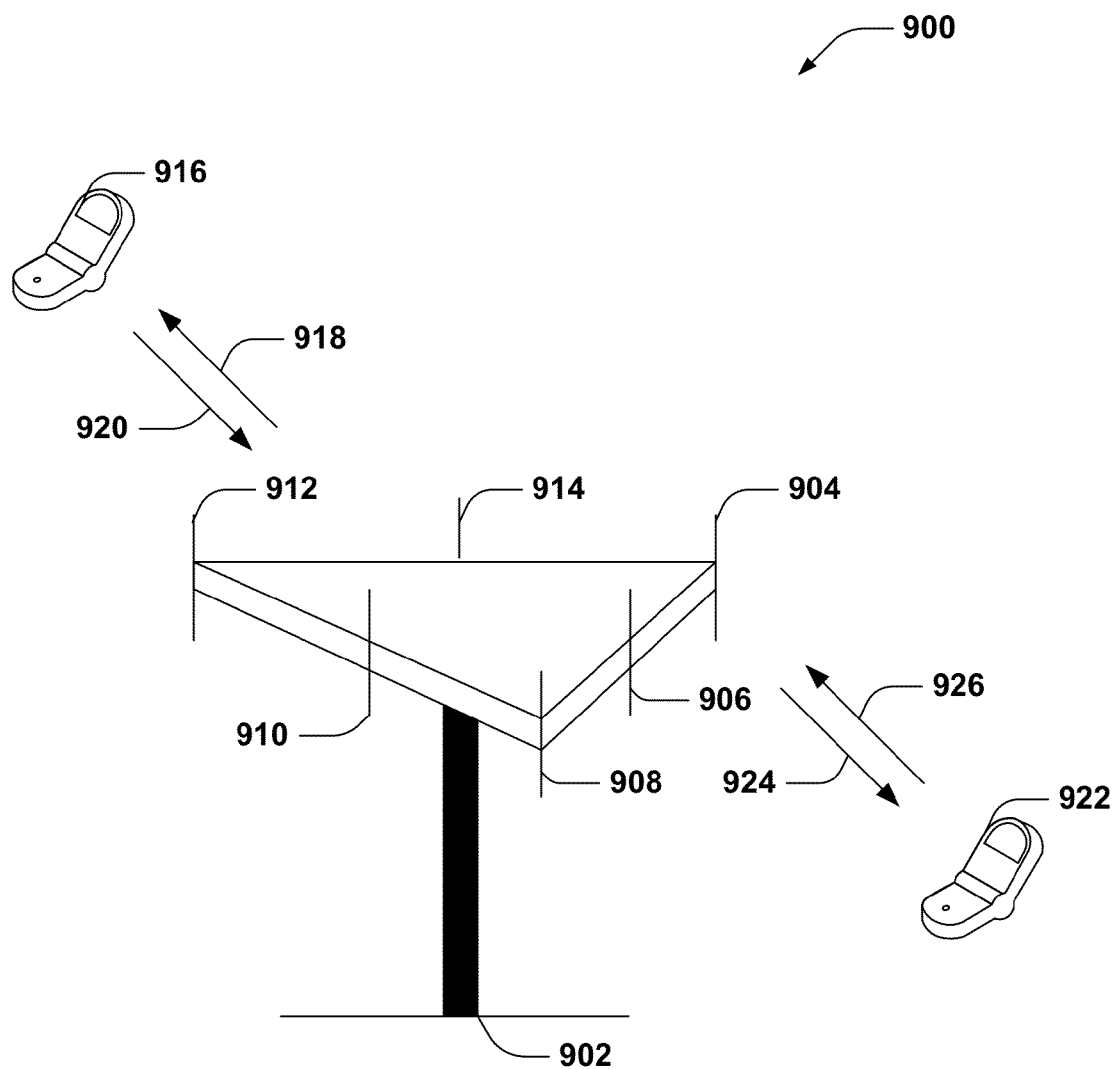
FIG. 9 is a block diagram of an aspect of a wireless communication system in accordance with various aspects set forth herein.

FIG. 9 illustrates a wireless communication system 900 in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted.

Figure 10:
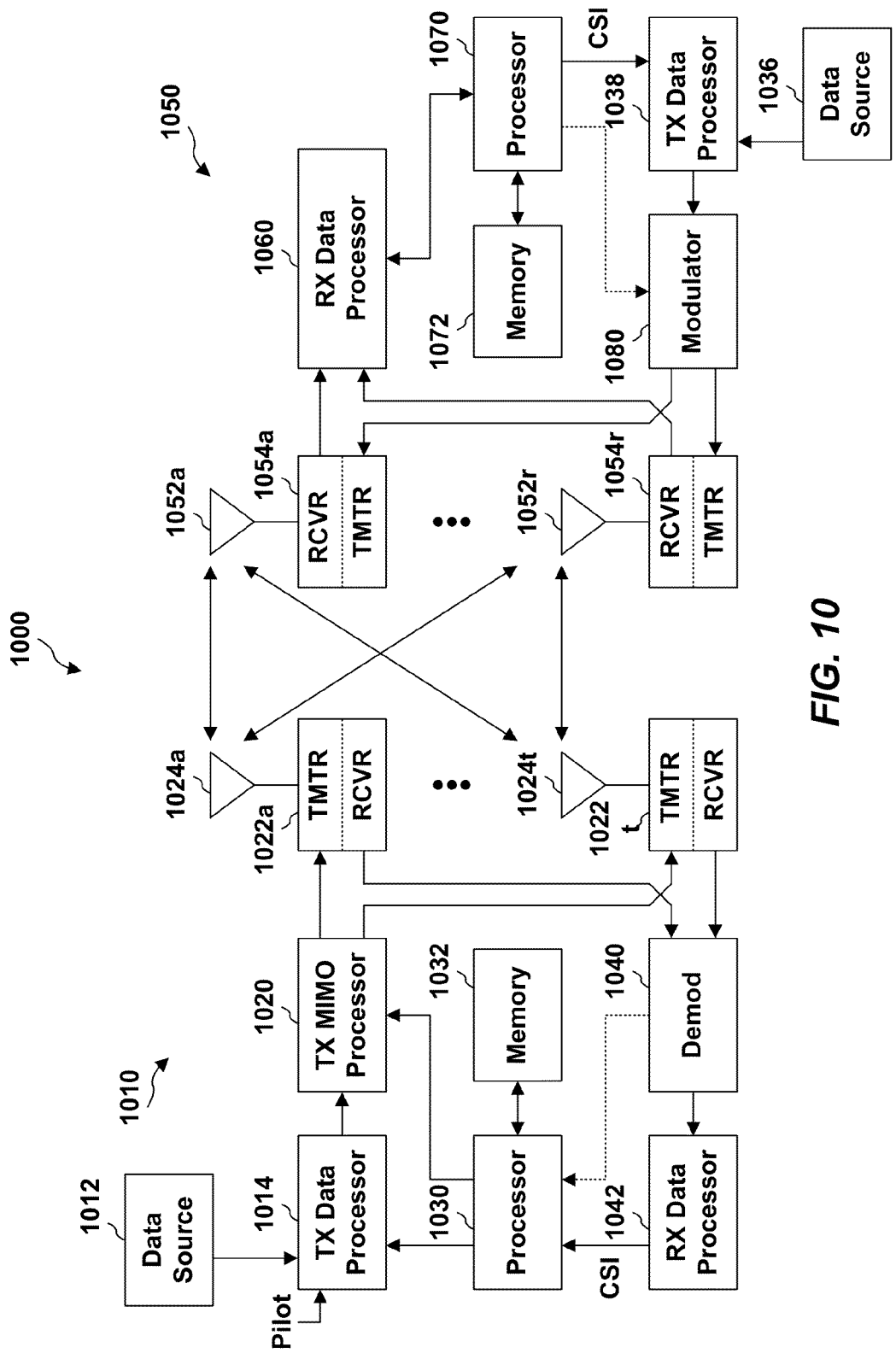
FIG. 10 is a schematic block diagram of an aspect of a wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. Moreover, base station 1010 can be a low power base station, in one example, such as one or more femto nodes previously described. In addition, it is to be appreciated that base station 1010 and/or mobile device 1050 can employ the example systems (FIGS. 1-4 and 7-9) and/or methods (FIGS. 5-6) described herein to facilitate wireless communication there between. For example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. For example, processor 1030 and/or 1070 can execute, and/or memory 1032 and/or 1072 can store instructions related to functions and/or components described herein, such as determining RF environment parameters, adjusting transmission parameters, and/or the like, as described.

Figure 11:
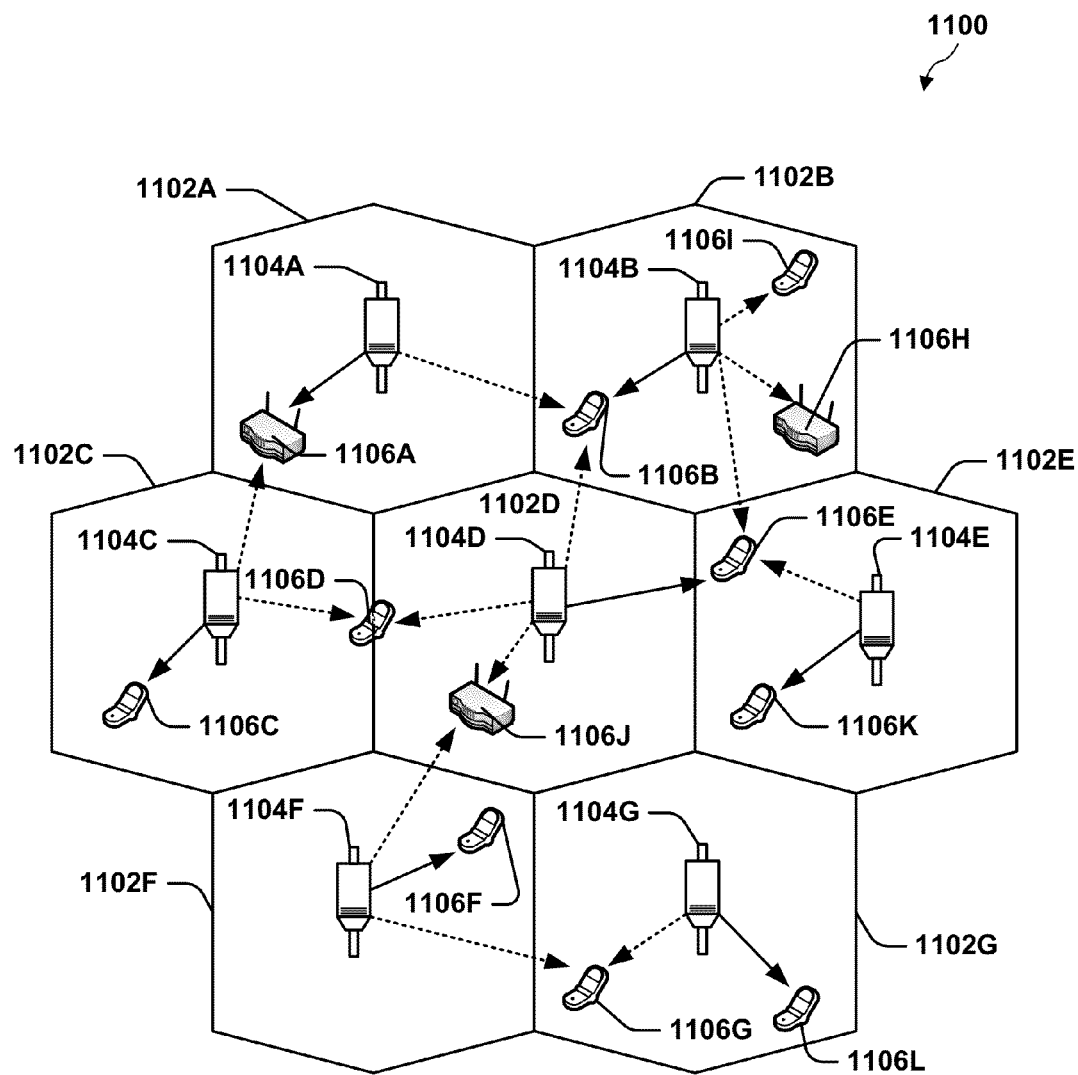
FIG. 11 illustrates an example wireless communication system, configured to support a number of devices, in which the aspects herein can be implemented.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., access nodes 1104A-1104G). As shown in FIG. 11, access terminals 1106 (e.g., access terminals 1106A-1106L) can be dispersed at various locations throughout the system over time. Each access terminal 1106 can communicate with one or more access nodes 1104 on a forward link (FL) and/or a reverse link (RL) at a given moment, depending upon whether the access terminal 1106 is active and whether it is in soft handoff, for example. The wireless communication system 1100 can provide service over a large geographic region.

Figure 12:
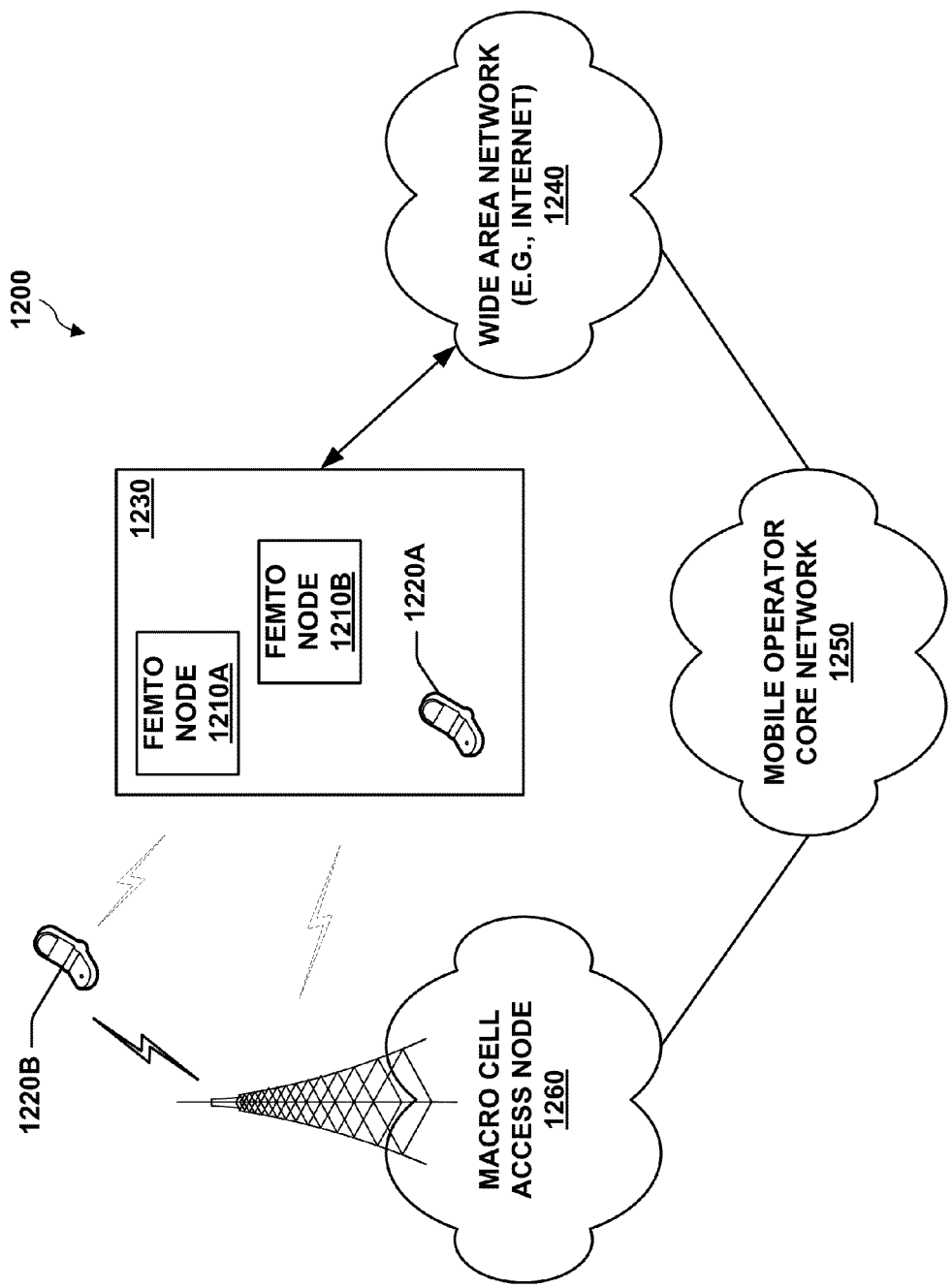
FIG. 12 is an illustration of an exemplary communication system to enable deployment of femtocells within a network environment.

FIG. 12 illustrates an exemplary communication system 1200 where one or more femto nodes are deployed within a network environment. Specifically, the system 1200 includes multiple femto nodes 1210A and 1210B (e.g., femtocell nodes or H(e)NB) installed in a relatively small scale network environment (e.g., in one or more user residences 1230). Each femto node 1210 can be coupled to a wide area network 1240 (e.g., the Internet) and a mobile operator core network 1250 via a digital subscriber line (DSL) router, a cable modem, a wireless link, or other connectivity means (not shown). As will be discussed below, each femto node 1210 can be configured to serve associated access terminals 1220 (e.g., access terminal 1220A) and, optionally, alien access terminals 1220 (e.g., access terminal 1220B). In other words, access to femto nodes 1210 can be restricted such that a given access terminal 1220 can be served by a set of designated (e.g., home) femto node(s) 1210 but may not be served by any non-designated femto nodes 1210 (e.g., a neighbor's femto node).

Figure 13:
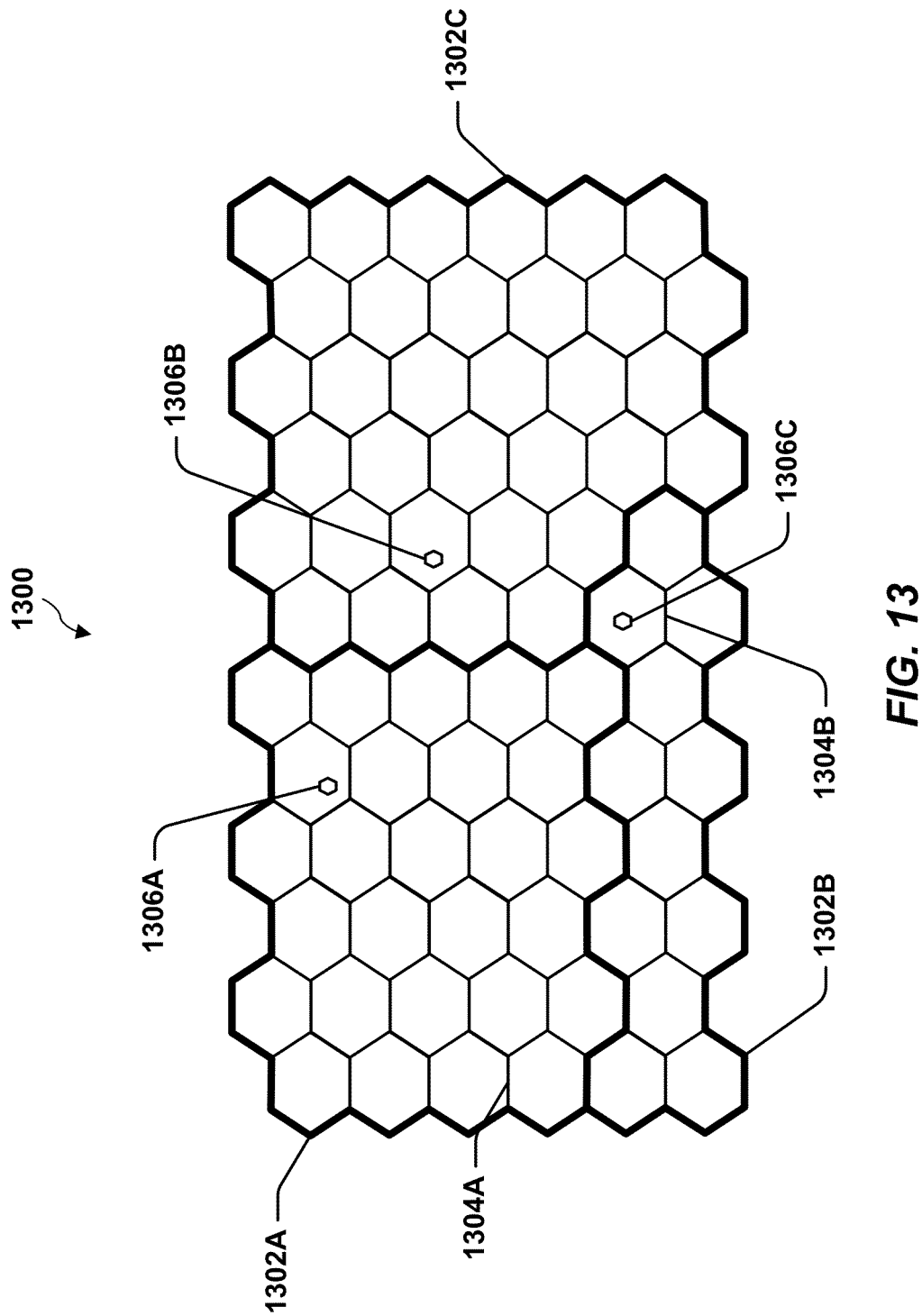
FIG. 13 illustrates an example of a coverage map having several defined tracking areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 can be defined with a given tracking area 1302 or macro coverage area 1304. Also, one or more pico coverage areas (not shown) can be defined within a given tracking area 1302 or macro coverage area 1304.

Referring again to FIG. 12, the owner of a femto node 1210 can subscribe to mobile service, such as, for example, 3G mobile service, offered through the mobile operator core network 1250. In addition, an access terminal 1220 can be capable of operating both in macro environments and in smaller scale (e.g., residential) network environments. Thus, for example, depending on the current location of the access terminal 1220, the access terminal 1220 can be served by an access node 1260 or by any one of a set of femto nodes 1210 (e.g., the femto nodes 1210A and 1210B that reside within a corresponding user residence 1230). For example, when a subscriber is outside his home, he is served by a standard macro cell access node (e.g., node 1260) and when the subscriber is at home, he is served by a femto node (e.g., node 1210A). Here, it should be appreciated that a femto node 1210 can be backward compatible with existing access terminals 1220.

A femto node 1210 can be deployed on a single frequency or, in the alternative, on multiple frequencies. Depending on the particular configuration, the single frequency or one or more of the multiple frequencies can overlap with one or more frequencies used by a macro cell access node (e.g., node 1260). In some aspects, an access terminal 1220 can be configured to connect to a preferred femto node (e.g., the home femto node of the access terminal 1220) whenever such connectivity is possible. For example, whenever the access terminal 1220 is within the user's residence 1230, it can communicate with the home femto node 1210.

In some aspects, if the access terminal 1220 operates within the mobile operator core network 1250 but is not residing on its most preferred network (e.g., as defined in a preferred roaming list), the access terminal 1220 can continue to search for the most preferred network (e.g., femto node 1210) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1220 can limit the search for specific band and channel. For example, the search for the most preferred system can be repeated periodically. Upon discovery of a preferred femto node, such as femto node 1210, the access terminal 1220 selects the femto node 1210 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1210 that reside within the corresponding user residence 1230). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing power control for a femto node deployed in a wireless network, comprising:
    measuring, by the femto node, a radio frequency (RF) environment parameter of the femto node related to a location in a coverage area;
    receiving a different RF environment parameter related to other femto nodes at the location in the coverage area; and
    adjusting a transmission parameter of the femto node based on the RF environment parameter and the different RF environment parameter, wherein the transmission parameter of the femto node is related to the coverage area.

2. The method of claim 1, wherein the RF environment parameter is a pathloss to the femto node from the location in the coverage area, and the different RF environment parameter is a signal strength of the other femto nodes observed at the location in the coverage area.

3. The method of claim 1, wherein the transmission parameter is a transmit power of the femto node.

4. The method of claim 1, wherein the adjusting comprises computing an adjustment for the transmission parameter based in part on the RF environment parameter or the different RF environment parameter along with one or more thresholds for achieving a network coverage or performance.

5. The method of claim 1, further comprising selecting an initial value for the transmission parameter based at least in part on one or more signal measurements of one or more nearby femto nodes.

6. The method of claim 5, wherein the adjusting comprises adjusting the initial value based at least in part on the RF environment parameter or the different RF environment parameter.

7. The method of claim 1, wherein the receiving comprises receiving the different RF environment parameter from a user equipment (UE).

8. The method of claim 7, further comprising requesting the different RF environment parameter from the UE at periodic intervals or based on one or more events.

9. The method of claim 7, wherein the UE provides the different RF environment parameter as part of a measurement report in a mobility procedure.

10. The method of claim 1, wherein the receiving comprises receiving the different RF environment parameter from the femto node, and the adjusting comprises indicating an adjusted value of the transmission parameter to the femto node.

11. The method of claim 1, further comprising adjusting the transmission parameter based on at least one of a detected call termination or a network loading indication.

12. The method of claim 1, wherein the measuring comprises measuring the RF environment parameter using a network listening module.

13. The method of claim 1, wherein the measuring comprises measuring a plurality of measurements of the RF environment parameter of the femto node over a period of time, and wherein the adjusting is further based on the plurality of measurements.

14. The method of claim 1, wherein the receiving comprises receiving a plurality of measurements of the RF environment parameter of the other femto nodes over a period of time, and the adjusting is further based on the plurality of measurements.

15. The method of claim 14, wherein the receiving comprises receiving the plurality of measurements from a plurality of user equipment.

16. An apparatus for performing power control for a femto node deployed in a wireless network, comprising:
   at least one processor configured to:
      measure, by the femto node, a radio frequency (RF) environment parameter of the femto node related to a location in a coverage area;
      receive a different RF environment parameter related to other femto nodes at the location in the coverage area; and
      adjust a transmission parameter of the femto node based on the RF environment parameter and the different RF environment parameter, wherein the transmission parameter of the femto node is related to the coverage area;
   and
   a memory coupled to the at least one processor.

17. The apparatus of claim 16, wherein the RF environment parameter is a pathloss to the femto node from the location in the coverage area, and the different RF environment parameter is a signal strength of the other femto nodes observed at the location in the coverage area.

18. The apparatus of claim 16, wherein the transmission parameter is a transmit power of the femto node.

19. The apparatus of claim 16, wherein the at least one processor adjusts the transmission parameter based in part on the RF environment parameter or the different RF environment parameter as compared to one or more thresholds for achieving a network coverage or performance.

20. The apparatus of claim 16, wherein the at least one processor is further configured to select an initial value for the transmission parameter based at least in part on one or more signal measurements of one or more nearby femto nodes, and wherein the at least one processor adjusts the initial value based at least in part on the RF environment parameter or the different RF environment parameter.

21. The apparatus of claim 16, wherein the at least one processor receives the different RF environment parameter from a user equipment (UE).

22. The apparatus of claim 16, wherein the at least one processor receives the different RF environment parameter from the femto node, and wherein the at least one processor adjusts the transmission parameter in part by indicating an adjusted value of the transmission parameter to the femto node.

23. An apparatus for performing power control for a femto node deployed in a wireless network, comprising:
   means for measuring, by the femto node, a radio frequency (RF) environment parameter of the femto node related to a location in a coverage area and receiving a different RF environment parameter related to other femto nodes at the location in the coverage area; and
   means for adjusting a transmission parameter of the femto node based on the RF environment parameter and the different RF environment parameter, wherein the transmission parameter of the femto node is related to the coverage area.

24. The apparatus of claim 23, wherein the RF environment parameter is a pathloss to the femto node from the location in the coverage area, and the different RF environment parameter is a signal strength of the other femto nodes observed at the location in the coverage area.

25. The apparatus of claim 23, wherein the transmission parameter is a transmit power of the femto node.

26. The apparatus of claim 23, wherein the means for adjusting computes an adjustment for the transmission parameter based in part on the RF environment parameter or the different RF environment parameter along with one or more thresholds for achieving a network coverage or performance.

27. The apparatus of claim 23, wherein the means for adjusting selects an initial value for the transmission parameter based at least in part on one or more signal measurements of one or more nearby femto nodes, and adjusts the initial value based at least in part on the RF environment parameter or the different RF environment parameter.

28. The apparatus of claim 23, wherein the means for measuring receives the different RF environment parameter from a user equipment (UE).

29. The apparatus of claim 23, wherein the means for measuring receives the different RF environment parameter from the femto node, and the means for adjusting indicates an adjusted value of the transmission parameter to the femto node.

30. A non-transitory computer-readable medium for performing power control for a femto node deployed in a wireless network, comprising:
   code for causing at least one computer to measure, by the femto node, a radio frequency (RF) environment parameter of the femto node related to a location in a coverage area;
   code for causing the at least one computer to receive a different RF environment parameter related to other femto nodes at the location in the coverage area; and
   code for causing the at least one computer to adjust a transmission parameter of the femto node based on the RF environment parameter and the different RF environment parameter, wherein the transmission parameter of the femto node is related to the coverage area.

31. The non-transitory computer-readable medium of claim 30, wherein the RF environment parameter is a pathloss to the femto node from the location in the coverage area, and the different RF environment parameter is a signal strength of the other femto nodes observed at the location in the coverage area.

32. The non-transitory computer-readable medium of claim 30, wherein the transmission parameter is a transmit power of the femto node.

33. The non-transitory computer-readable medium of claim 30, wherein the code for causing the at least one computer to adjust adjusts the transmission parameter based in part on the RF environment parameter or the different RF environment parameter as compared to one or more thresholds for achieving a network coverage or performance.

34. The non-transitory computer-readable medium of claim 30, further comprising code for causing the at least one computer to select an initial value for the transmission parameter based at least in part on one or more signal measurements of one or more nearby femto nodes, and wherein the code for causing the at least one computer to adjust adjusts the initial value based at least in part on the RF environment parameter or the different RF environment parameter.

35. The non-transitory computer-readable medium of claim 30, wherein the code for causing the at least one computer to receive receives the different RF environment parameter from a user equipment (UE).

36. The non-transitory computer-readable medium of claim 30, wherein the code for causing the at least one computer to receive receives the different RF environment parameter from the femto node, and wherein the code for causing the at least one computer to adjust adjusts the transmission parameter in part by indicating an adjusted value of the transmission parameter to the femto node.

37. An apparatus for performing power control for a femto node deployed in a wireless network, comprising:
 a radio frequency (RF) measuring component of the femto node for determining an RF environment parameter of the femto node related to a location in a coverage area and receiving a different RF environment parameter related to other femto nodes at the location in the coverage area; and
 a transmission adjusting component for adjusting a transmission parameter of the femto node based on the RF environment parameter and the different RF environment parameter, wherein the transmission parameter of the femto node is related the coverage area.

38. The apparatus of claim 37, wherein the RF environment parameter is a pathloss to the femto node from the location in the coverage area, and the different RF environment parameter is a signal strength of the other femto nodes observed at the location in the coverage area.

39. The apparatus of claim 37, wherein the transmission parameter is a transmit power of the femto node.

40. The apparatus of claim 37, wherein the transmission adjusting component computes an adjustment for the transmission parameter based in part on the RF environment parameter or the different RF environment parameter along with one or more thresholds for achieving a network coverage or performance.

41. The apparatus of claim 37, wherein the transmission adjusting component selects an initial value for the transmission parameter based at least in part on one or more signal measurements of one or more nearby femto nodes.

42. The apparatus of claim 41, wherein the transmission adjusting component adjusts the initial value based at least in part on the RF environment parameter or the different RF environment parameter.

43. The apparatus of claim 37, wherein the RF measuring component receives the different RF environment parameter from a user equipment (UE).

44. The apparatus of claim 43, wherein the RF measuring component requests the different RF environment parameter from the UE at periodic intervals or based on one or more events.

45. The apparatus of claim 43, wherein the UE provides the different RF environment parameter as part of a measurement report in a mobility procedure.

46. The apparatus of claim 37, wherein the RF measuring component receives the different RF environment parameter from the femto node, and the transmission adjusting component indicates an adjusted value of the transmission parameter to the femto node.

47. The apparatus of claim 37, wherein the transmission adjusting component adjusts the transmission parameter based on at least one of a detected call termination or a network loading indication.

48. The apparatus of claim 37, wherein the RF measuring component determines the RF environment parameter at least in part by measuring the RF environment parameter using a network listening module.

49. The apparatus of claim 37, wherein the RF measuring component determines a plurality of measurements of the RF environment parameter of the femto node over a period of time, and the transmission adjusting component adjusts the transmission parameter further based on the plurality of measurements.

50. The apparatus of claim 37, wherein the RF measuring component receives a plurality of measurements of the RF environment parameter of the other femto nodes over a period of time, and the transmission adjusting component adjusts the transmission parameter further based on the plurality of measurements.

51. The apparatus of claim 50, wherein the RF measuring component receives the plurality of measurements from a plurality of user equipment.

\* \* \* \* \*

UNITED STATES PATENT AND TRADEMARK OFFICE
CERTIFICATE OF CORRECTION

PATENT NO. : 8,862,140 B2
APPLICATION NO. : 13/527451
DATED : October 14, 2014
INVENTOR(S) : Varun Khaitan and Mehmet Yavuz It is certified that error appears in the above-identified patent and that said Letters Patent is hereby corrected as shown below:

On the Title Page, Item (54) and in the Specification, Column 1, lines 1-3, title should read:
METHOD AND SYSTEM FOR DEPLOYMENT AND CONTROL OF SMALL CELLS.

Signed and Sealed this
Tenth Day of February, 2015

Michelle K. Lee
*Deputy Director of the United States Patent and Trademark Office*